United States Patent [19]

McGregor

[11] 3,808,588

[45] Apr. 30, 1974

[54] TERMINAL CLIP FOR CIRCUIT BOARDS

[75] Inventor: Donald G. McGregor, Pawtucket, R.I.

[73] Assignee: Electrix Corporation, Smithfield, R.I.

[22] Filed: Feb. 16, 1972

[21] Appl. No.: 226,840

[52] U.S. Cl. ........ 339/217 S, 339/17 R, 339/252 P, 339/275 B, 339/276 T

[51] Int. Cl. .......... H01r 9/06

[58] Field of Search ............ 339/17 R, 17 C, 217 R, 339/217 S, 252, 275 R, 275 B, 223, 276

[56] References Cited

UNITED STATES PATENTS

| | | | |
|---|---|---|---|
| 3,363,217 | 1/1968 | Garver et al. | 339/217 S X |
| 2,825,036 | 2/1958 | Sorensen | 339/275 R X |
| 3,008,119 | 11/1961 | Swengel | 339/17 R X |
| 3,336,561 | 8/1967 | Whiting | 339/17 R |
| 1,683,418 | 9/1928 | Shaw et al. | 339/276 T |
| 3,096,136 | 7/1963 | Batcheller | 339/223 R X |

*Primary Examiner*—Joseph H. McGlynn
*Assistant Examiner*—Lawrence J. Staab
*Attorney, Agent, or Firm*—Salter & Michaelson

[57] ABSTRACT

A terminal clip for anchoring an electrical lead in a circuit board and including jaws that are foldable into engagement with the electrical lead, and a tongue having a spring finger that is off-set laterally with respect to the jaws and defining a stop for preventing inadvertent removal of the clip from an opening in the circuit board after the clip is inserted therethrough.

2 Claims, 5 Drawing Figures

TERMINAL CLIP FOR CIRCUIT BOARDS

BACKGROUND OF THE INVENTION

The present invention relates to a terminal clip that is attached to the end of an electrical lead and that is secured in an opening formed in a printed circuit board for electrically interconnecting the lead to the printed circuit board.

Prior to the instant invention, terminal clips which have been used to secure electrical leads to a printed circuit board were not altogether satisfactory, since they could be inadvertently disengaged from the printed circuit board during handling and before the solder connection was made. The conventional prior known clip was formed from a spring material that was designed to frictionally retain the clip within an opening in the board; but the spring fingers as formed on the clip had a tendency to retract or lose their resiliency thereby causing the clip to become loose in the opening, which on occasion would result in the clip accidentally becoming separate from the printed circuit board.

SUMMARY OF THE INVENTION

The present invention includes a clip for use in anchoring an electrical lead in an opening formed in a printed circuit board and comprises a body portion having at least one set of opposed jaws formed thereon that are foldable into engagement with the electrical lead. A tongue is joined to the outer end of the body portion and projects outwardly therefrom, the tongue having a reversely bent free end that defines a flexible spring finger. The spring finger is normally off-set laterally with respect to the body portion so that when the body portion is insertable into the opening in the printed circuit board, the spring finger is forced inwardly but flexes outwardly to the normal off-set position upon clearing the opening. The spring finger thereafter overlies the surface of the printed circuit board adjacent to the opening so as to define a stop for preventing inadvertent removal of the clip from the opening. Since the spring finger is off-set laterally with respect to the body portion, it does not interfere with the locating of the electrical lead that is clamped between the jaws of the clip.

Accordingly, it is an object of the present invention to provide a clip for securely anchoring an electrical lead in a printed circuit board.

Another object of the invention is to provide a printed circuit board clip that includes a tongue having a reversely bent free end that is laterally off-set so as to not interfere with the electrical lead to which the clip is secured.

Still another object is to provide a clip for use in anchoring an electrical lead in a printed circuit board that is formed with opposed jaws that secure the clip to the electrical lead and that is further formed with an off-set spring finger joined to an outwardly extending tongue, the spring finger flexing outwardly when the clip is inserted through an opening in the printed circuit board and defining a stop for preventing accidental removal of the clip through the opening.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figures 1, 2, 3:
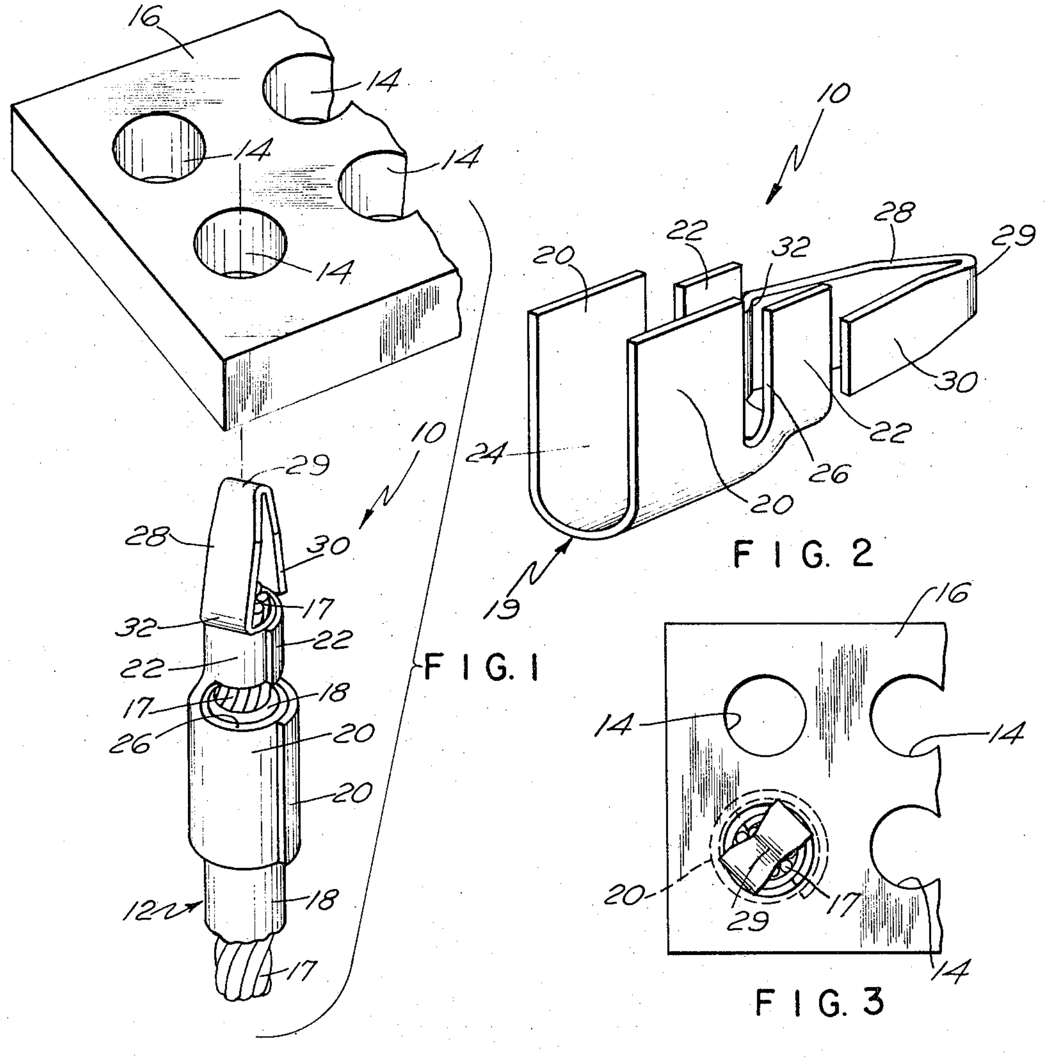
FIG. 1 is a perspective view of the terminal clip embodied in the present invention and as attached to an electrical lead that is insertable into an opening in a printed circuit board.
FIG. 2 is a perspective view of the terminal clip prior to securement thereof to an electrical lead.
FIG. 3 is a top plan view of the clip and lead as illustrated in FIG. 1.

Referring now to the drawing and particularly to FIGS. 1 and 2, the terminal clip as embodied in the present invention is illustrated and is generally indicated at 10. The terminal clip 10 is intended for use in anchoring an electrical lead 12 in an opening 14 as formed in a substantially flat board 16; and in this connection, the board 16 is designed for use as a printed circuit board. It is understood that the printed circuit board 16 would normally include a plurality of circuits that are prearranged therein, a plurality of spaced openings being preformed in the board and receiving similar terminal clips to which electrical leads are secured, and the electrical leads cooperating with the printed circuits to establish a preselected electrical circuit in the board 16. As will be evident from the following description, the terminal clip 10 securely anchors the electrical lead 12 in the opening 14 prior to the further securing of the lead to the board 16 by a conventional solder connection. As illustrated in FIG. 1, the electrical lead 12 includes a wire conducting portion 17 which is covered by insulation 18 in the conventional manner.

As illustrated in FIG. 2, the terminal clip 10 includes a body portion generally indicated at 19 that is initially formed in a blank and is thereafter shaped, preferably by stamping, to include a first set of jaws 20 that are located in opposed relation, and a second set of jaws 22 that are also located in opposed relation and cooperate with the jaws 20 to form a channel 24 therebetween. Laterally extending grooves 26 are formed in the body portion 19 and separate the sets of jaws 20 and 22 in the manner as indicated. The jaws 20 are intended to engage the insulation 18 of the electrical lead 12 while the jaws 22 will engage the exposed portion 17. For this purpose the longitudinal and lateral dimensions of the jaws 20 are somewhat greater than that of the jaws 22 so that when the jaws 20 and 22 are folded into engagement with the electrical lead 12, and the jaws 20 securely grip the insulation 18 and the jaws 22 grip the wire conductor portion 17 in electrical conducting relation. It is seen that the channel 24 as formed between the sets of jaws 20 and 22 receives the electrical lead 12 therein, and the jaws 20 and 22 are folded into engagement therewith to securely anchor the clip 10 to the electrical lead 12.

Joined to the body portion 19 and extending outwardly therefrom is a tongue 28 that is bent at the outermost end 29 to form a reversely bent free end that defines a spring finger 30. Instead of securing the tongue 28 to the body portion 19 as an extension of the channel 24 between the jaws 22, the tongue 28 is formed as an extension of one of the jaws 22. Thus, the junction of the tongue 28 with the body portion 19 is laterally off-set with respect to the longitudinal axis of the clip. By locating the tongue 28 in the position as illustrated, the reversely bent spring finger is also off-set with respect to the jaws 20 and 22 and is located out of alignment with respect to the longitudinal axis of the body portion and the channel 24 in which the lead 12 is secured. Thus, the exposed portion 17 of the lead 12 may extend as far into the channel 24 as required without being impeded therein by the tongue 28 or the spring finger 30, and the exposed portion 17 may also project above the board 16 for securement to a solder overlay that is applied after the clip 10 is fixed in place, as will be described.

Figure 4:
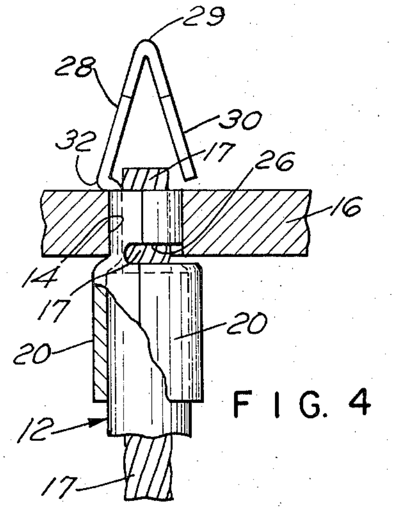
FIG. 4 is an elevational view with parts shown in section of the clip and electrical lead as mounted in an opening in a printed circuit board.
Figure 5:
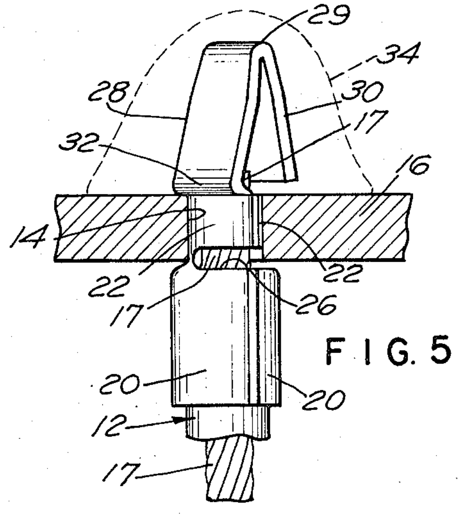
FIG. 5 is a view similar to FIG. 4 except that the clip is shown partially in perspective and a solder overlay is shown in phantom.

As more clearly illustrated in FIGS. 4 and 5, the junction of the tongue 28 with the adjacent jaw 22 forms a laterally extending projection 32, which forms a stop for securing the clip 10 in the board opening 14 and further acts to prevent accidental removal of the clip from the opening 14 when the clip is inserted therein.

In use, the electrical lead 12 is secured to the terminal clip 10 by extending the lead 12 into the channel 24 and then folding the jaws 20 into engagement with the insulation 18 and the jaws 22 into engagement with the exposed portion 17. As previously described, since the reversely bent spring finger 30 is off-set with respect to the jaws, the lead 12 can be inserted as far into the channel 24 as required without the exposed portion 17 being encountered by the tongue 28 or spring finger 30. The lead 12 is then anchored into the opening 14 of the printed circuit board 16 by inserting the clip 10 through the opening 14, the narrow outermost portion 29 of the tongue 28 providing for leading of the clip through the opening 14. As the clip moves into the opening, the reversely bent spring finger 30 flexes inwardly; and as the spring finger 30 and the projection 32 clear the opening, the projection locks into place on the edge of the opening, as illustrated in FIG. 4; and the spring finger 30 is released to flex outwardly into overlying relation with respect to the surface of the board 16 that is adjacent to the opening 14. It is seen that projection 32 and the spring finger 30 define stops that prevent inadvertent withdrawal of the clip 10 through the opening 14.

In order to firmly secure the clip 10 and the electrical lead 12 in the opening 14 of the printed circuit board and to further establish electrical communication therein, a layer of solder 34 is placed over the tongue 28 that projects above the board 16. Since the wire conductor portion 17 of the electrical lead 12 is exposed within the tongue and is not impeded by the spring finger 30, a positive electrical connection can be obtained between the lead 12 and the circuit in the board 16. The clip 10 and electric lead 12 are also now firmly anchored in position in the board 16.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A clip for use in anchoring an electrical lead in an opening formed in a substantially flat plate, comprising a body portion having a first set of opposed jaws formed thereon between which a channel is defined that receives the electrical lead therein, a second set of opposed jaws formed on said body portion between which said channel extends, oppositely extending lateral grooves being formed in said body portion to define the sets of opposed jaws, said sets of jaws being foldable into engagement with said electrical lead for securing it in electrical engagement in said channel, and a tongue joined to the outer end of said body portion as an extension of one of the jaws of said first set, said tongue having a reversely bent free end that defines a flexible spring finger that terminates adjacent to but that is disconnected from the other jaw of said first set, the junction of said tongue with the one jaw of said first set being such that the spring finger is normally offset laterally with respect to the longitudinal axis of said body portion, wherein the spring finger is displaced from overlying relation with respect to said channel or a continuation thereof so that the electrical lead is receivable in said channel without interference with said tongue or spring, said body portion being insertable into the opening in said plate, wherein said spring finger is forced inwardly toward the longitudinal axis of the body portion as the tongue is inserted through the opening, the spring finger thereafter flexing outwardly to the normal offset position upon clearing the opening and overlying the surface of the plate adjacent to the opening so as to define a stop for preventing withdrawal of the clip through the opening.

2. A clip as set forth in claim 1, the first set of opposed jaws as folded into engagement with said electrical lead defining a reduced neck section located between said tongue and offset spring finger and the other set of opposed jaws as folded into engagement with said lead, the reduced neck section being receivable in said opening in said plate and being locked therein as the projection formed on said tongue and the offset spring finger cooperate with the folded other set of jaws to define stops on opposite sides of said plate.

* * * * *